Jan. 31, 1967          H. C. FEDER          3,300,877

PERCENTAGE DECISION MULTI-STUDENT TEACHING SYSTEM

Filed Jan. 19, 1965          3 Sheets-Sheet 1

INVENTOR.
HUBERT C. FEDER
BY Harry A. Herbert Jr.
Sherman H. Goldman
ATTORNEYS

Jan. 31, 1967     H. C. FEDER     3,300,877
PERCENTAGE DECISION MULTI-STUDENT TEACHING SYSTEM
Filed Jan. 19, 1965     3 Sheets-Sheet 3

INVENTOR.
HUBERT C. FEDER
BY Harry A. Herbert Jr.
Sherman H. Solomon
ATTORNEYS

United States Patent Office 3,300,877
Patented Jan. 31, 1967

3,300,877
PERCENTAGE DECISION MULTI-STUDENT
TEACHING SYSTEM
Hubert C. Feder, 1517 Roosevelt Ave.,
Alamogordo, N. Mex. 88310
Filed Jan. 19, 1965, Ser. No. 426,697
2 Claims. (Cl. 35—9)

The invention described herein may be manufactured and used by or for the United States Government for governmental purposes without payment to me of any royalty thereon.

This invention relates generally to multi-student decision teaching systems which are comprised of a projector, individual student response panels, a logic unit, and an information storage unit. Particularly, the invention allows for teaching of a level differentiated, instructional program to a group of students with the percentage of the correct student responses used as a measure and means to automatically control the selection of each subsequent instructional step out of the optional program frames.

Teaching machines have become recognized as an aid in reducing the administrative burden on teachers, the relieving of overcrowded classrooms and the improvement of teaching by means of logical and systematic program development.

The commonly applied concept of utilizing separate teaching machines for each individual student is deemed to be an unnecessary expense in that group teaching with proper class distribution allows for the reduction of individual differences. The system of this invention enables the improvement of teaching by providing classroom teacher with means to assist in developing progressively better programs for conventional classroom situations. Variation of the program for different groups may be easily effected by the teacher and a desired program may be processed into a slide arrangement by use of conventional photographic techniques. In addition, the system provides the teacher a complete record of both individual student and class progress, thereby eliminating much of the administrative work which burdens the teachers.

By using the automatic system of this invention designed to operate without live teacher in recognized group teaching practices while still maintaining teacher contact with the class, the teacher is able to determine the degree of comprehension of individual students as each point is presented and permits the teacher to re-emphasize a particular point when the desired percentage response is not reached. When an individual student makes a correct response and the class fails to meet the required threshold the continuous flow programming provides expansion in a new form to avoid the material from becoming boring and also to provide the student with the correct response with new material from which he may still learn or affirm his knowledge. When the students achieve the desired threshold the system causes the projector to skip one or more frames of informative material and proceeds to the next important point to be covered. By using a flexible system this invention permits multi-choice responses as well as limited constructive responses when utilized with a code system.

Accordingly, it is a primary object of this invention to provide a teaching system which enables multi-student instruction.

It is another object of this invention to provide a novel teaching system wherein automatic program advancement is dependent upon the system percentage threshold in comparison with the achieved percentage of correct student responses.

It is still another object of this invention to provide a teaching means which enables a continuous flow of material which is nonrepetitive.

It is a further object of this invention to provide a teaching system which is flexible with regard to class level and size and which enables teacher participation in program interpretation and development.

Still another object of this invention is to provide a novel teaching system which enables automatic scoring of student and class response with multi-choice and coded constructive responses to an instructional program using branching or linear methods of progression.

A still further object of this invention involves the provision of a novel teaching aid which is comprised of a classroom projector, a logic unit, information storage unit, and individual student response panels.

It is another primary object of this invention to provide a novel method of classroom instruction in that individual differences of students can be allowed for by multi-level programs.

These and other advantages, features and objects of the invention will become more apparent from the following description taken in connection with the illustrative embodiments in the accompanying drawings, wherein.

Figure 1:
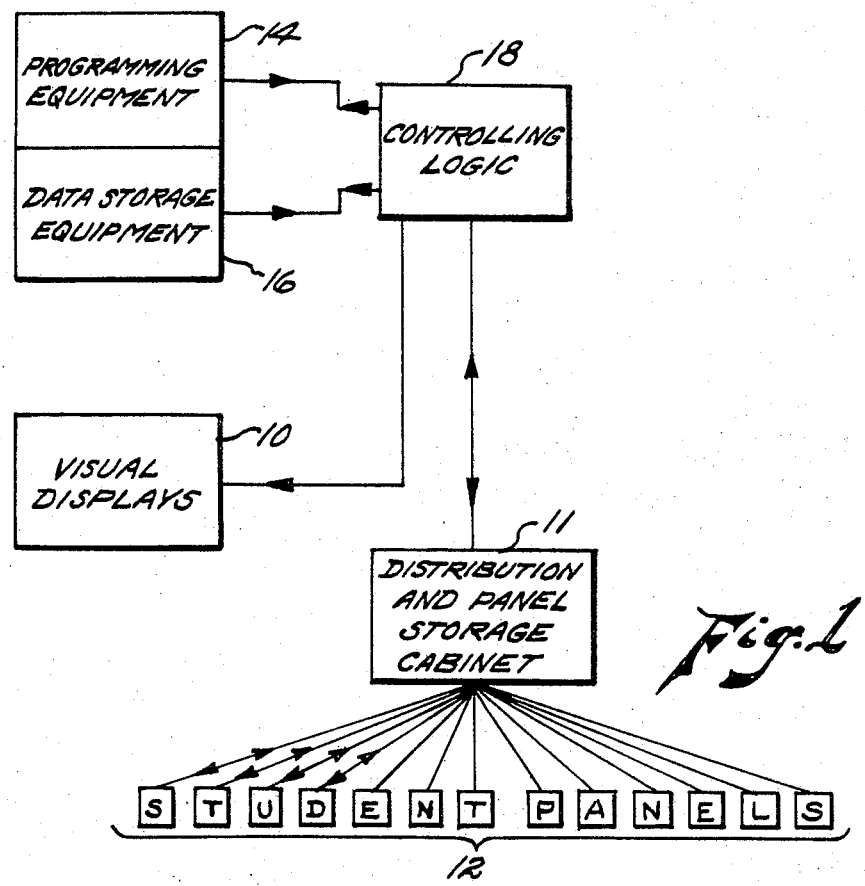
FIGURE 1 is a block representation of the system disclosed.

In FIGURE 1 the system is shown as four main equipment blocks, the visual display equipment 10, student response equipment 12, programming and data storage equipment 14 and 16 respectively, and the controlling logic 18.

The visual display equipment may consist of either a microfilm projector modified for large screen projection or a remotely operated slide projector of the home use type. The microfilm projector is preferable in that it allows the operator to select the frame number, and automatically drive to this frame. Such projectors are commercially available and otherwise known in the art. The home type slide projector, while more economical to obtain, has the disadvantage of limited speed and capacity. The function of the visual display is to permit all students to view the question or questions presented on a screen for a controlled period of time permitting a more accurate evaluation of the program and class comprehension.

The student response equipment comprises one panel for each student in the class. All response panels are connected to the controlling logic 18, via electrical harness through the distribution and panel storage cabinet 11.

The programming and data storage equipment comprises a paper tape reader for programming and a data tape punch for storage. The specific details of the programming and storage equipment will not be discussed herein, however there are many commercial devices of this nature available which could be used as part of this invention.

The purpose of the programmer 14 is to allow the system to progress in a logical automatic mode. A prepunched paper tape prepared to an exact format by the program writer accomplishes the desired results. Each hole in the tape, when fed through the tape reader, will actuate a specific relay in the logic network of the system, thus allowing the system a grading capability from question to question as the program advances. The tape must, of course, be in synchronization with the frame or questions being displayed.

The controlling logic 18 is the heat of the system. All other components feed signals into it and receive signals from it.

Figure 2:
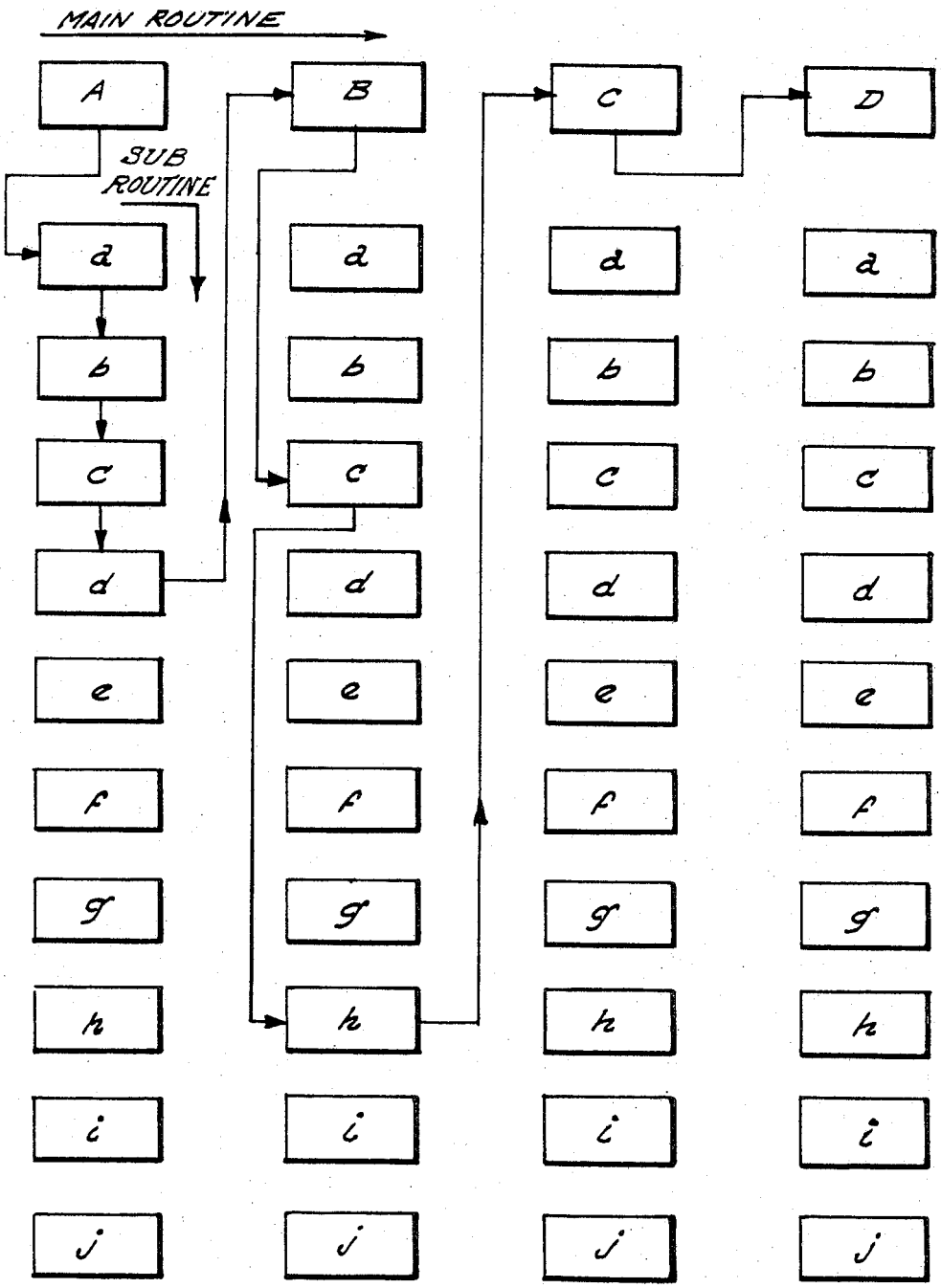
FIGURE 2 is a diagrammatic representation of the normal progression of instruction characterized by this system.

In FIGURE 2 are shown three examples of program progression with this system. The instructional program is divided in main routine frames A, B, C, D . . . of basic instructions which must be presented to the group and subroutine frames a, b, c, d . . . of informatory material which are coded in relation to the percentage classes or thresholds of the system. The electrical coding of the main routine and subroutine represents the primary objective of this invention to automatically control the program progression by comparison of the percentage correct group response with the system percentage class or threshold assigned to the individual frames of the instructional program. As a first example in FIGURE 2 is shown a linear program progression in that (any) main routine A is followed by subsequently displayed subroutine steps a, b, c, etc. without frame skipping until a percentage class (d of example) is reached which in the instructional program is coded to proceed to the next main routine B. The second example shown in FIGURE 2 makes use of the branching method for which the correct group response by automatic comparison with the percentage classes of the system determines which percentage class coded frames will be skipped respectively displayed during program progression. (For example B→c, c→h, h→C.) The third example in FIGURE 2 shows that a direct succession of main routine steps (C→D) is possible in all cases where the group response reaches the highest percentage class required in the subroutines between these two main routines.

Alternatively to the automatic operation of the system, the teacher may actively participate in the instructional course by voluntary stopping and starting the system at any point of the program. In any event, by comparing the percentage of correct answers for the frame being displayed with the percentage of correct answers on the previous frame the system itself determines whether the class achievement is progressive. Should class achievement decrease or stagnate rather than increase the fault would be in the program, and the system would automatically cease operation and an alarm would be given to allow the teacher to determine the cause.

Figure 3:
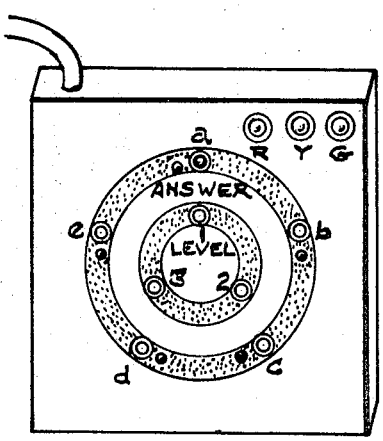
FIGURE 3 is a pictorial view of the student response panel.

In FIGURE 3 is shown a student response panel which includes eight switches and eight lights. When the program endeavors to obtain a more complete record of student response it will display several (e.g. three) questions of different degrees of difficulty or level, the student in turn selects the level at which he wishes to answer and closes the appropriate level switch 1, 2, or 3. No distinction other than by visual observation and recording is made between the different levels of approach, i.e. all correct answers, regardless of what level, have the same weight in the automatic decision on program progression to facilitate the application of automatic group instruction. The level switches may be mutually exclusive or the system be so arranged as to permit a limited time for changing levels.

The switches a through e are activated after a level is chosen by the student and allow the student to select his answer. The answer switches may likewise be mutually exclusive or the system may be so arranged as to permit a limited time for changing answers.

A light on the panel signals the student as various stages of the program proceed. A red light R informs the student that he has not yet made a complete response. A yellow light Y warns him that he has only a short time remaining to respond, a green light G tells him immediately if his response was correct. A white light W next to each answer switch will tell the student which is the correct answer after he has made his selection.

Figure 4:
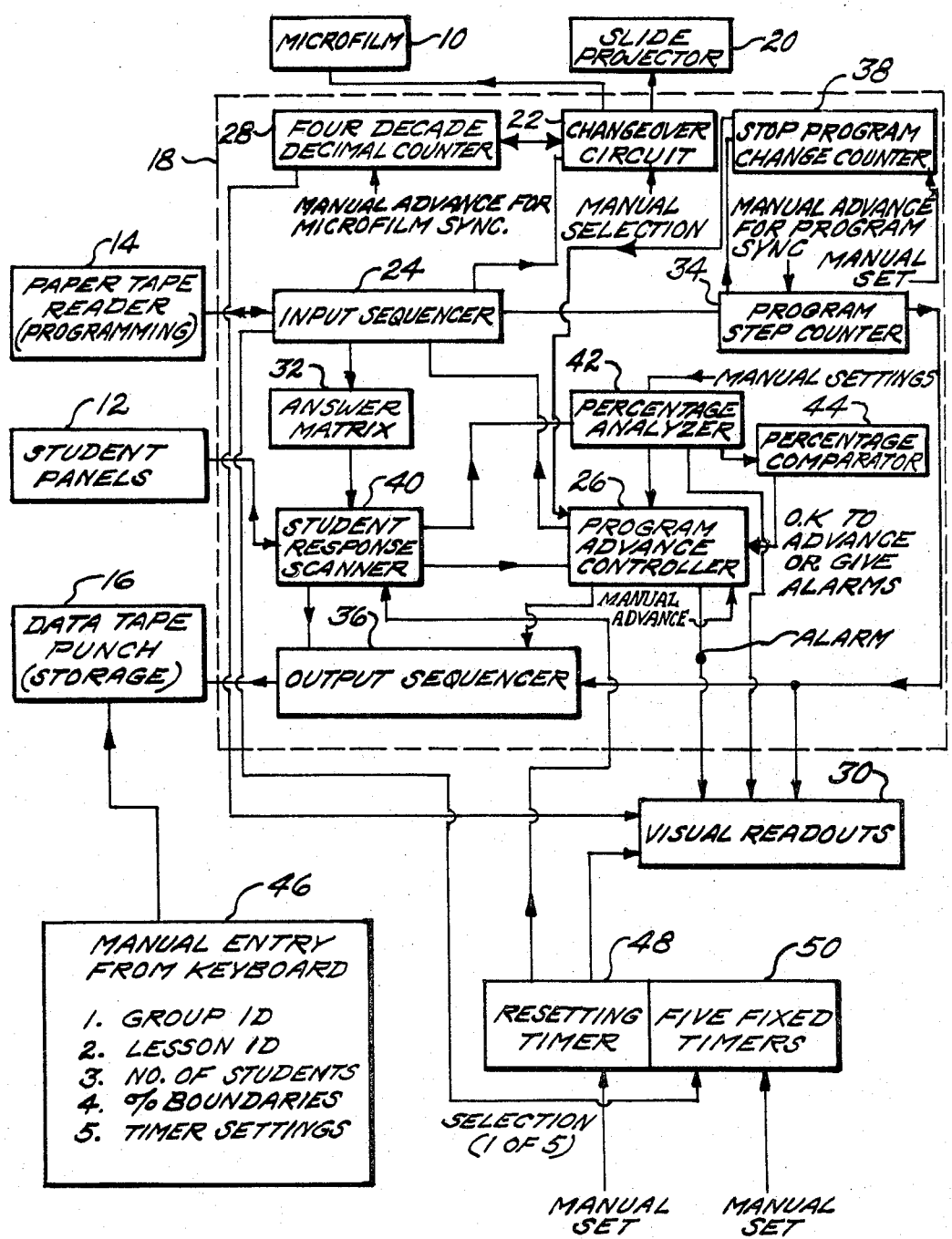
FIGURE 4 is a detailed block diagram of the entire system.

Referring now to FIGURE 4, the microfilm projector 10 and/or slide projector 20 is connected to the logic through a changeover circuit 22. The circuit may consist of a multi-contact relay which permits the instructor to select the apparatus he desires to utilize for a particular program. The spare contacts on the relay will be used to transmit signals from the input sequencer 24 to the projection device to advance the program as called for by the program advance controller 26.

The four decade decimal counter 28 is synchronized with the microfilm projector 10 and appears as a visual readout 30, thus indicating at all times the part of the program being displayed. The paper tape reader 14, upon command of the program advance controller 26 feeds the programed information into the input sequencer 24. Such information would include, the signal to advance display material, the answer information which is further sent to the answer matrix 32 and an information signal to the program step counter 34. The program step counter 34 includes a manual advance for program synchronization and a visual readout 30 which is a three decade decimal counter permitting the instructor to be aware of the subroutine step displayed. The program step counter sends a signal to the output sequencer 36 to provide a correlation between answer data and question data. The program step counter 34 also feeds a signal to the stop program down counter 38 by which the instructor may manually set a program stop if he does not wish to explore all subroutines of a particular main routine. The stop program down counter 38 in turn feeds the necessary signal to program advance controller 26 to effectively stop the program. The stop program down counter may be of a decimal counter of conventional design with a switch tripping attachment to stop the program progression when desired.

The student panels 12 are directly connected through the distribution and panel storage cabinet to the student response scanner 40 of the logic 18. The scanner receives the level and answer signal and channels these directly to the output sequencer 36. The student response scanner 40 also compares the individual response with the signal from the answer matrix 32 and feeds a correct answer signal to the green light G if the individual student response is correct and signal to the white light W adjacent the correct answer switch if the students response is incorrect. In addition the student response scanner 40 sends a signal to the program advance controller 26, which will not function unless the entire class has responded, and finally a signal for correct responses to the percentage analyzer 42. The percentage analyzer 42 determines the percentage of the class giving a correct answer. A manual setting is provided to indicate the number of students in the class. The program advance controller 26 indicates to the percentage analyzer 42 the number of students responding and the student response scanner 40 the number of correct answers. The percentage determination may be compiled by means of relays and a stepper switch or alternatively by scanning voltages in an analog circuit. The percentage achieved signal is indicated by two decimal counters on the visual readout panel 30.

The percentage comparator 44 receives a signal from the percentage analyzer and compares this signal with a preset percentage signal or threshold. If the percentage achieved signal is equal to or exceeds the preset signal or threshold the program will advance, if it fails to equal or exceed the preset signal the program will stop and an alarm will be given on the visual readout panel 30 permitting the instructor to re-emphasize specific points of the instructional program. The program advance controller 26 is provided with a manual advance to enable the instructor to restart the program after he has more thoroughly explained the subject matter.

The output sequencer 36 receives information from the student response scanner 40, the program advance controller 26 and the program step counter 34 and channels this material into the data tape punch 16 where it is stored along with the information from the manual entry keyboard 46.

The timing sequence is controlled by six timers, five fixed timers 50 are set for different time intervals, and activated by the input sequencer 24 depending upon the time programed for the question material and is called manual pacing. As the fixed time ends the yellow light Y on the student panel 12 will light and the resetting timer 48 will be activated. As each student answers the timer 48 is reset until all students have answered and the timer "times out." The timers have indicators on the visual readout panel 30. The timer 48 sends a signal to the student response scanner 40 indicating that the time has ended for response. If any students have failed to respond when the timer 48 has timed out the program will stop and an alarm will be given.

The timers 50 are set by the instructor according to the program and individually activated according to the question by the information given to the input sequencer 24 by the paper tape reader 14.

Although the invention has been described with reference to a particular embodiment, it will be understood to those skilled in the art that the invention is capable of a variety of alternative embodiments within the spirit and scope of the appended claims.

I claim:

1. A multi-student teaching system comprising: means for presenting material to a plurality of students in the form of separate frames, each frame divided into different levels of instruction and each level having associated therewith plural answers at least one of which is correct, means individual to each student for selecting his level of instruction; means individual to each student enabling him to register his answer, to the selected level of instruction; means for establishing progressively the percentage of correct responses from said answer selection means to the total number of students and comparing said percentage with a programmed acceptable percentage; and means controlled by the rate at which correct responses are registered for establishing the display time for each frame.

2. A multi-student teaching system according to claim 1 including: means controlled by the answer comparison means and display time control means for automatically selecting a subsequent frame.

References Cited by the Examiner
UNITED STATES PATENTS

| | | | |
|---|---|---|---|
| 3,108,384 | 10/1963 | Jazbutis et al. | 35—11 |
| 3,121,959 | 2/1964 | Uttal | 35—9 |
| 3,190,014 | 6/1965 | Rhodes | 35—48 |

EUGENE R. CAPOZIO, *Primary Examiner.*

R. E. KLEIN, *Assistant Examiner.*